No. 868,046. PATENTED OCT. 15, 1907.
G. A. & A. H. WELCH.
CORN HUSKING MACHINE.
APPLICATION FILED JUNE 2, 1906.
3 SHEETS—SHEET 1.
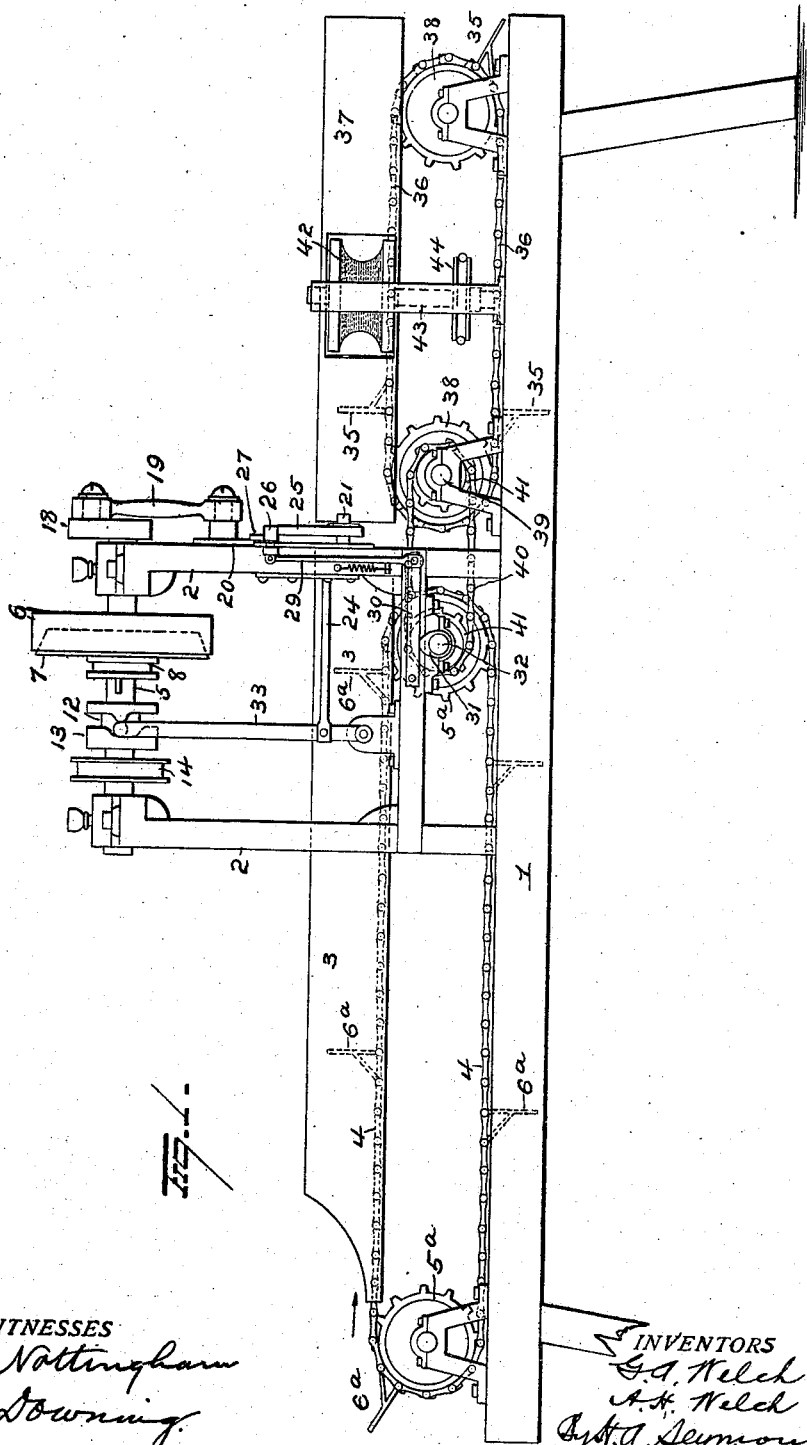
WITNESSES
INVENTORS
Attorney

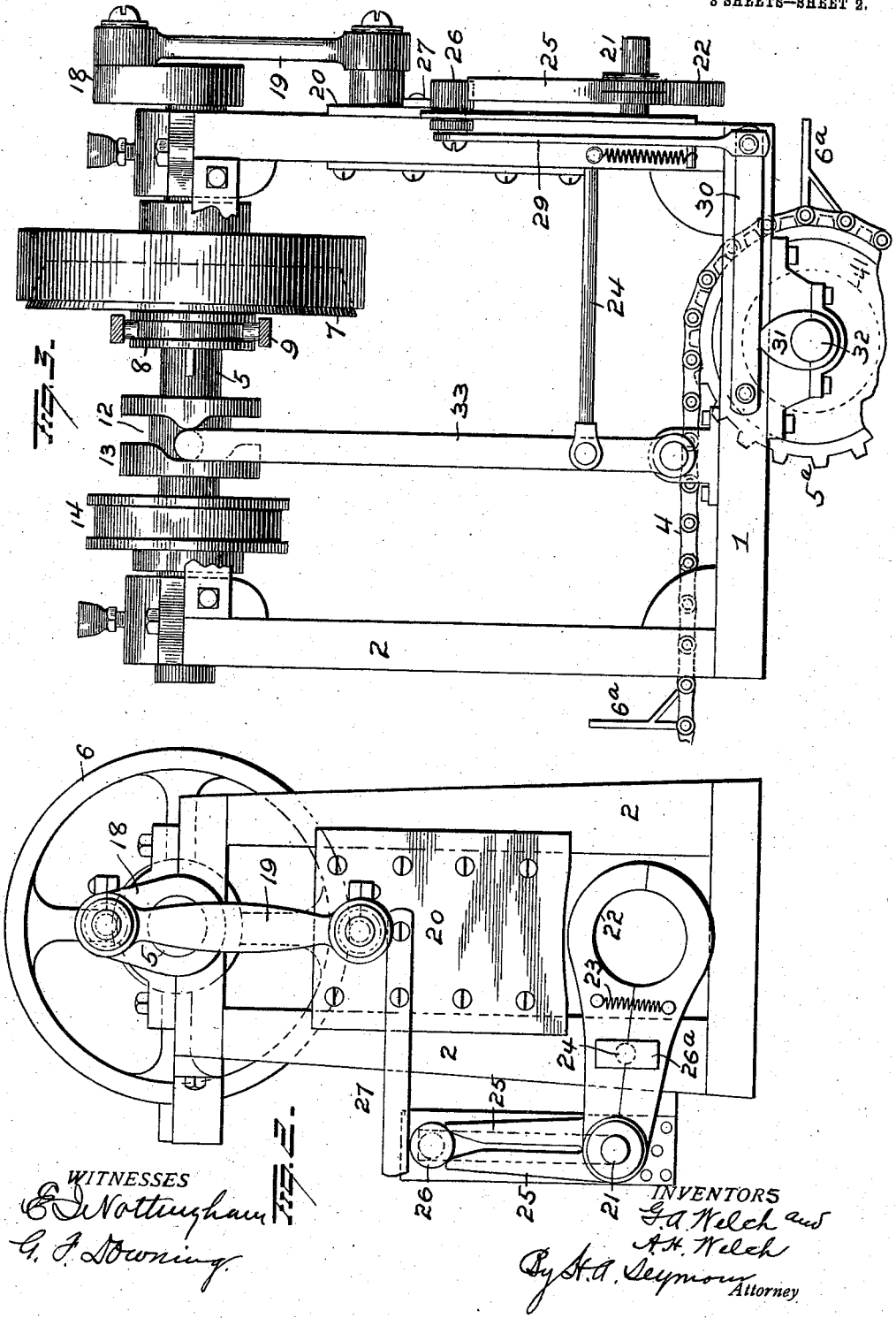

No. 868,046.
PATENTED OCT. 15, 1907.
G. A. & A. H. WELCH.
CORN HUSKING MACHINE.
APPLICATION FILED JUNE 2, 1906.
3 SHEETS—SHEET 3.
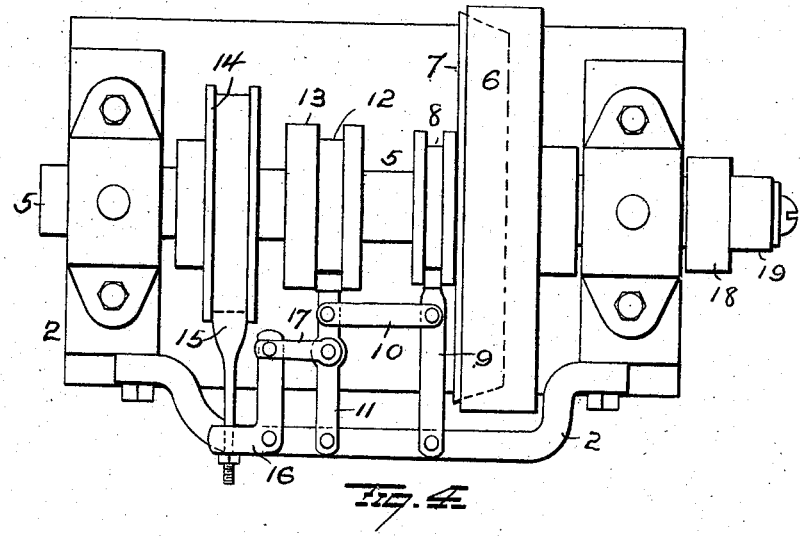
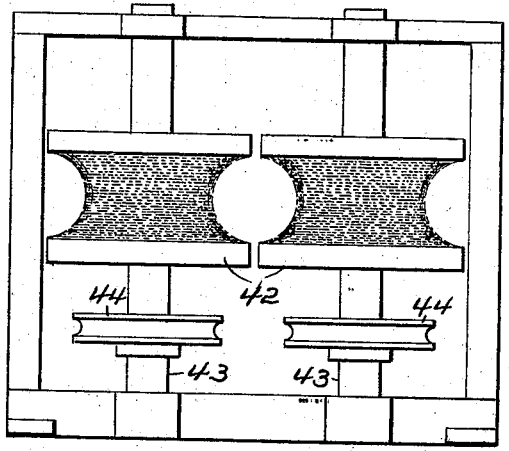
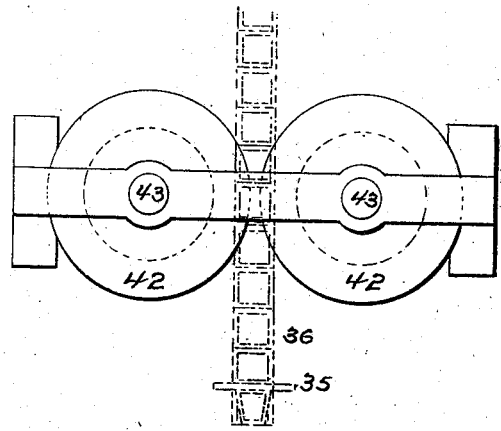
WITNESSES
INVENTORS

UNITED STATES PATENT OFFICE.

GEORGE A. WELCH AND ARTHUR H. WELCH, OF LEWISTON, MAINE.

CORN-HUSKING MACHINE.

No. 868,046.     Specification of Letters Patent.     Patented Oct. 15, 1907.

Application filed June 2, 1906. Serial No. 319,937.

*To all whom it may concern:*

Be it known that we, GEORGE A. WELCH and ARTHUR H. WELCH, residents of Lewiston, in the county of Androscoggin and State of Maine, have invented certain new and useful Improvements in Corn-Husking Machines; and we do hereby declare the following to be a full, clear, and exact description of the invention, such as will enable others skilled in the art to which it appertains to make and use the same.

Our invention relates to improvements in corn husking machines, an object of the invention being to provide improved means, automatically set in operation by the moving ears of corn, to sever the butt end of the corn, and improved means for husking and cleaning the corn of silk.

A further object is to provide improved mechanism for controlling the operation of the cutter, and improved means for feeding the ears of corn through the machine.

With these and other objects in view, the invention consists in certain novel features of construction and combinations and arrangements of parts as will be more fully hereinafter described and pointed out in the claims.

In the accompanying drawings, Figure 1 is a side view, illustrating our improvements. Fig. 2 is an end view of the cutting mechanism. Fig. 3 is a side view thereof. Fig. 4 is a top view, and Figs. 5 and 6 are side and top views of the husking brushes.

1 represents the main frame of the machine, and 2 is a central frame, supporting the cutting mechanism, which will be hereinafter explained. A horizontal corn feeding tube 3 is supported on frame 1 and an endless feed chain 4, moves through the tube 3 and is supported on sprocket wheels 5ª and driven thereby. The chain 4 is provided, at regular intervals, with blades 6ª, secured at right angles to the chain and adapted to feed the corn forward in the tube. The corn is placed in the open end of the tube onto chain 4, and is fed forward, butt end first.

At the upper end of central frame 2, a horizontal shaft 5 is mounted in suitable bearings, and a drive pulley 6, loose on the shaft, is driven continuously from any desired source of power. The pulley 6, is locked to turn the shaft 5, by means of a friction clutch 7, keyed to slide on shaft 5, and provided with an annularly grooved hub 8, in which an arm 9, pivoted to frame 2, is located. This arm 9 is connected by a link 10, with a similarly pivoted arm 11, the latter located in the cam slot 12 of a roller 13 keyed to slide on shaft 5 and moved when the cam roller 13 is moved, as will be hereinafter pointed out. A brake wheel 14 is also keyed to shaft 5 and has a brake band 15 operated by a bell-crank-lever 16, pivoted to frame 2 and connected by a link 17 with arm 11 and controlled by the movement of said arm 11.

One end of shaft 5 is provided with a crank arm 18, which latter, is connected by a link 19, with a vertically movable cutter blade 20 to sever the butt ends of the ears of corn.

A journal 21 is located at one end of frame 2, and our improved guide 22 has a pivotal and sliding movement on said journal. The guide 22, comprises two members normally held together by a coiled spring 23, secured at its respective ends to the members, and each member at its inner end, which projects across the corn passage, has a semi-circular recess, and said recesses register to form a circular opening to receive the butt end of the corn. The members of guide 22 are also recessed to receive a rod 24, the latter having a large head 26ª to prevent escape of the rod from the guide, when the guide members are separated. Both members of the guide 22 have upwardly projecting arms 25 at their pivoted end, and these arms are beveled at their upper ends, to form an entrance for a guide block 26, the latter mounted to move vertically. An arm 27 is secured to the blade of cutter 20, so that when the cutter descends, the arm 27, will strike the guide block 26 to force the latter down between arms 25 and separate the guide members to release the ear of corn and permit it to be moved along.

The guide block 26 is connected with a depending link 29, and the latter is secured to the free end of a pivoted lever 30. This lever 30 is in the path of a cam 31 on a shaft 32 carrying one of the sprocket wheels 5ª, and this cam 31, at the proper time, strikes lever 30 and elevates the guide block, to its normally raised position.

The rod 24, above referred to, is secured to a vertical lever 33, pivoted at its lower end, and having its upper end, projecting into the cam slot 12 of roller 13 to throw the clutch 7.

As the ear of corn is forced along, the butt end will enter the opening in guide 22 and move the guide, thus drawing rod 24 and swinging lever 33, which movement of the lever 33, causes roller 13 to slide on shaft 5, and through the medium of arms 11 and 9, causes the clutch 7 to lock the pulley 6 to shaft 5, and turn the latter. The crank arm 18 at the end of shaft 5, forces the cutter 20 downward to sever the butt end of the ear of corn, and the arm 27 on the cutter, strikes guide block 26 and causes the guide to open and release the ear of corn. Cam 31 will then engage lever 30 and elevate the guide block to its former position after the cutter rises. When the clutch 7 is thrown in, the brake band 15 is released from brake wheel 14 by the bell-crank-lever 16, and as the shaft 5 completes a single revolution, the cam slot 12 in roller 13 will move arms 11 and 9 to release clutch 7 and also operate bell-crank-lever 16 to tighten the brake band 15 on the wheel 14 and prevent the momentum of the shaft, carrying too far.

After the butt ends of the ears of corn are severed, the corn is engaged by the blades 35 on a chain conveyer 36 and carried through a tube 37. The chain 36 is mounted on sprocket wheels 38 and motion is transmitted to the shaft 39 of one of said sprocket wheels 38, by means of a chain 40, which latter connects sprocket wheels 41 on the shafts 32 and 39. The chain 36 carries the corn between concave brushes 42, secured on vertical shafts 43 and driven in opposite directions by pulleys 44 at the lower ends of the shafts to effectually husk the corn and remove the silk, and the cleaned corn will be ejected from the end of tube 37 and may be collected at this point and conveyed away in any approved manner.

A great many slight changes might be made in the general form and arrangement of the parts described without departing from our invention, and hence, we do not restrict ourselves to the precise details set forth but consider ourselves at liberty to make such slight changes and alterations as fairly fall within the spirit and scope of my invention.

Having fully described our invention, what we claim as new and desire to secure by Letters-Patent is:—

1. In an apparatus of the character described, the combination with means for feeding ears of corn, of a cutter, means for operating the same, a guide to receive the corn, means actuated by said guide for throwing the cutter-operating-means into action to operate the cutters to sever the butt ends of the ears of corn, means for releasing the corn from the guide and means for husking and cleaning the corn.

2. In an apparatus of the character described, the combination with a conveyer, of a cutter disposed over the line of travel of the conveyer, means to be actuated by ears of corn on the conveyer to automatically operate the cutter to sever the ends of the ears, and means in the line of travel of the conveyer operating automatically to husk the ears of corn.

3. In an apparatus of the character described, the combination with a corn conveyer, a shaft, and a continuously turning pulley loose on the shaft, of a cutter to sever the butt ends of the corn, a crank arm on the shaft, a link connecting the crank arm and cutter, a clutch on the shaft, and means operated by the moving ear of corn to throw the clutch and compel the cutter to operate to sever the butt end of the corn.

4. In an apparatus of the character described, the combination with a corn conveyer, a shaft, and a continuously turning drive pulley loose on the shaft, of a clutch to lock the pulley to the shaft, a cutter, a crank arm on the shaft, a link connecting the cutter and crank arm, a movable guide having an opening to receive the butt end of the corn, devices operated when the guide is moved, to throw the clutch and compel the cutter to operate, and means operated by the cutter, to open the guide and release the corn after its butt end has been severed.

5. In an apparatus of the character described, the combination with a corn conveyer, a shaft, and a drive pulley loose on the shaft, of a clutch to lock the pulley to the shaft, a roller mounted to slide on the shaft and having a cam groove, a pivoted arm in the cam groove, a pivoted arm projecting into the grooved hub of the clutch, a link connecting the said pivoted arms, a lever having its end located in the cam groove of the roller, a cutter, a crank arm on the shaft to operate the cutter, and means operated by the corn to move the lever to throw the clutch and compel the operation of the cutter to sever the butt end of the ear of corn.

6. In an apparatus of the character described, the combination with a corn conveyer and a cutter to sever the butt ends of the corn, of a guide to receive the corn and compel the operation of the cutter, said guide comprising two pivoted members, arms on said members, and a guide block operated by the cutter to move the block between the arms to open the guide and release the corn therefrom.

7. In an apparatus of the character described, the combination with a corn conveyer, and a cutter to sever the butt ends of the ears of corn, of a shaft to operate the cutter, a drive pulley loose on the shaft, a clutch to lock the pulley and shaft together, a roller on the shaft having a cam groove therein and connected by movable devices to compel the roller and clutch to move together, a lever in the cam groove of the roller, means operated by the corn to move the lever and throw the clutch and compel the cutter to operate, and said clutch thrown back by the cam groove in the roller, a brake wheel on the shaft, a brake band on the wheel, a bell-crank-lever operating the brake band, and said lever moved by the roller to release the brake when the roller moves in a direction to throw the clutch into operation, and apply the brake when the roller is moved back, to prevent the shaft from turning more than a complete revolution.

8. In an apparatus of the character described, the combination with a corn conveyer, of a guide having an opening to receive the butt end of the corn, a cutter to sever the butt end of the corn and brought into operation when the guide is moved by the corn, means for opening the guide to release the corn, and devices returning the said means to normal position after the corn has been cut, and brushes to husk and clean the corn.

9. In an apparatus of the character described, the combination with a tube, a corn conveyer therein having blades to engage and move the corn, of a cutter to sever the butt ends of the corn, means operated by the moving corn to compel the operation of the cutter, another conveyer taking the corn from the point of cutting, and concave revolving brushes between which the last-mentioned conveyer moves the corn to husk and remove the silk from the corn.

In testimony whereof, we have signed this specification in the presence of two subscribing witnesses.

GEORGE A. WELCH.
ARTHUR H. WELCH.

Witnesses:
MICHAEL J. HAGERTY,
FLORENCE B. CASH.